(12) United States Patent
Usukura et al.

(10) Patent No.: US 9,432,658 B2
(45) Date of Patent: Aug. 30, 2016

(54) IMAGE DISPLAY DEVICE

(75) Inventors: Tohru Usukura, Osaka (JP); Ken Mashitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 272 days.

(21) Appl. No.: 14/124,416

(22) PCT Filed: Jun. 20, 2012

(86) PCT No.: PCT/JP2012/004005
§ 371 (c)(1),
(2), (4) Date: Dec. 6, 2013

(87) PCT Pub. No.: WO2012/176445
PCT Pub. Date: Dec. 27, 2012

(65) Prior Publication Data
US 2014/0098205 A1    Apr. 10, 2014

(30) Foreign Application Priority Data

Jun. 20, 2011  (JP) ................................. 2011-136636

(51) Int. Cl.
*H04N 13/04*    (2006.01)
*G02B 27/22*    (2006.01)
*G09G 3/00*     (2006.01)

(52) U.S. Cl.
CPC ...... *H04N 13/0409* (2013.01); *G02B 27/2214* (2013.01); *H04N 13/0468* (2013.01); *H04N 13/0477* (2013.01); *G09G 3/003* (2013.01); *G09G 2320/0209* (2013.01)

(58) Field of Classification Search
CPC ................................................ H04N 13/0409
USPC ........................................................... 345/59
See application file for complete search history.

(56) References Cited

U.S. PATENT DOCUMENTS

| | | |
|---|---|---|
| 5,663,831 A | 9/1997 | Mashitani et al. |
| 6,791,570 B1 | 9/2004 | Schwerdtner et al. |

(Continued)

FOREIGN PATENT DOCUMENTS

| | | |
|---|---|---|
| CN | 1595226 | 3/2005 |
| CN | 1695077 | 11/2005 |

(Continued)

OTHER PUBLICATIONS

International Search Report issued Sep. 18, 2012 in International (PCT) Application No. PCT/JP2012/004005.

(Continued)

*Primary Examiner* — Hung Dang
*Assistant Examiner* — Girumsew Wendmagegn
(74) *Attorney, Agent, or Firm* — Wenderoth, Lind & Ponack, L.L.P.

(57) ABSTRACT

An image display device displays a plurality of image elements of a left-view image and a plurality of image elements of a right-view image on a display in alternation in a horizontal direction, and displays an image element of a black image between each adjacent pairing of an image element of the left-view image and an image element of the right-view image. The image display device uses a parallax barrier to ensure that a left eye of a viewer only views the left-view image and that a right eye of the viewer only views the right-view image. Through the above configuration the image display device reduces occurrence of cross-talk regardless of position of the viewer or shape of the parallax barrier, and improves image quality of a stereoscopic image.

3 Claims, 8 Drawing Sheets

(56) References Cited

U.S. PATENT DOCUMENTS

| | | | |
|---|---|---|---|
| 2005/0052529 A1 | 3/2005 | Mashitani et al. | |
| 2005/0264651 A1* | 12/2005 | Saishu | H04N 13/0011 348/51 |
| 2006/0114561 A1 | 6/2006 | Mashitani et al. | |
| 2006/0125916 A1 | 6/2006 | Mashitani et al. | |
| 2006/0227420 A1* | 10/2006 | Cha | H04N 13/0454 359/465 |
| 2008/0036853 A1 | 2/2008 | Shestak et al. | |
| 2011/0273463 A1* | 11/2011 | Lee | G02B 27/2264 345/545 |

FOREIGN PATENT DOCUMENTS

| | | |
|---|---|---|
| CN | 1700776 | 11/2005 |
| CN | 1708995 | 12/2005 |
| CN | 101356832 | 1/2009 |
| JP | 7-15750 | 1/1995 |
| JP | 7-287195 | 10/1995 |
| JP | 2001-95014 | 4/2001 |
| JP | 2001-506435 | 5/2001 |
| JP | 2005-164916 | 6/2005 |
| JP | 2005-331844 | 12/2005 |
| JP | 2007-17822 | 1/2007 |
| JP | 4119484 | 7/2008 |

OTHER PUBLICATIONS

Office Action and Search Report issued Apr. 23, 2015 in Chinese Application No. 201280030032.5, with partial English translation.

* cited by examiner (a)   (b)   (c)

(a)

(b)

(c)

(a)

(b)

(c)

(a)　　　　　(b)　　　　　(c)

(a)　　　　　(b)　　　　　(c)

(a)

(b)

IMAGE DISPLAY DEVICE

TECHNICAL FIELD

The present invention relates to an image display device which enables stereoscopic viewing through use of a barrier, lenticular lens or similar structure with a flat display such as a plasma display panel (PDP), a liquid-crystal display or an electroluminescent (EL) display.

BACKGROUND ART

Conventional systems for viewing a stereoscopic image without use of 3D specialty glasses include a parallax barrier system and a lenticular system. In the parallax barrier system, images from a plurality of different viewpoints are displayed on an image display unit such as a PDP. For example, in the case of two viewpoints, a left-view image and a right-view image are displayed. Stereoscopic viewing is enabled by using a parallax barrier to separate the plurality of images in a manner such that a left eye of a viewer views the left-view image and a right eye of the viewer views the right-view image. The parallax barrier is a masking plate including masking portions which mask light and aperture portions which transmit light. The parallax barrier has a function of separating the plurality of images by using the masking portions to control direction of light emitted from the image display unit.

The parallax barrier is designed under a premise that the viewer is viewing from a position which is suitable for stereoscopic viewing (referred to below as an optimum viewing position). When the viewer is not viewing from the optimum viewing position a state may occur in which the left eye views the right-view image in addition to the left-view image and in which the right eye views the left-view image in addition to the right-view image. The aforementioned state is referred to as "cross-talk".

In order to reduce cross-talk, a system has been proposed in which position of a viewer is detected, and subsequently display position of a left-view image and display position of a right-view image on an image display unit is controlled in accordance with the position of the viewer (for example, Patent Literature 1).

CITATION LIST

Patent Literature

Patent Literature 1: Japanese Patent Application Publication No. 2001-506435

SUMMARY OF INVENTION

Technical Problem

Unfortunately, depending on position of the viewer or configuration of an image separation unit (for example, a parallax barrier), reduction of cross-talk may not be possible even when the conventional art described above is used.

In order to solve the above problem, the present invention aims to provide an image display device which reduces occurrence of cross-talk, regardless of position of a viewer or configuration of an image separation unit.

Solution to Problem

In order to solve the above problem, a video display device relating to the present invention comprises: a display unit configured to display a plurality of image elements of a first image and a plurality of image elements of a second image in one display pattern; and a separation unit configured to optically separate the image elements of the first image and the image elements of the second image displayed in the one display pattern, wherein in the one display pattern: the image elements of the first image and the image elements of the second image are alternately arranged in a horizontal direction; and along a line in the horizontal direction, an image element of a third image which is not the first image or the second image is positioned between each adjacent pairing of an image element of the first image and an image element of the second image.

Advantageous Effects of Invention

Through the image display device relating to the present invention, cross-talk occurring due to position of a viewer or configuration of the image separation unit can be reduced, and consequently image quality of a stereoscopic image can be improved.

DESCRIPTION OF EMBODIMENTS

Figure 1:
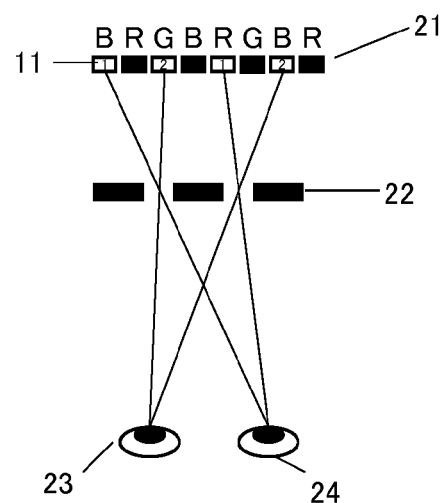
FIG. 1 is an overview diagram illustrating, for a first embodiment of the present invention, positional relationship of a viewer and an image display device.

The following explains a problem occurring in display of a stereoscopic image which was recognized through research by the inventor of the present invention.

As explained above, in the system disclosed in Patent Literature 1, cross-talk is reduced by controlling display position of the left-view image and display position of the right-view image on the image display unit in accordance with position of the viewer. More specifically, display positions of the left-view image and the right-view image are controlled by shifting the left-view image and the right-view image on the image display unit in accordance with change in position of the viewer.

During shift processing in Patent Literature 1, there is no change in positional relationship between regions for displaying the left-view image and regions for displaying the right-view image. However, depending on position of the viewer, change may occur in positional relationship between regions of the image display unit which can be viewed by a left eye of the viewer (referred to below as a left eye viewing area) and regions of the image display unit which can be viewed by a right eye of the viewer (referred to below as a right eye viewing area).

Normally a left eye viewing area viewed through one aperture portion is positioned to the right of a right eye viewing area viewed through the same aperture portion by the viewer. When the viewer moves further away from the image display device, the left eye viewing area and the right eye viewing area which are viewed through the one aperture portion move in directions such as to overlap with one another. For example, the left eye viewing area moves to the left and the right eye viewing area moves to the right.

On the other hand, when the viewer moves closer to the image display device the left eye viewing area and the right eye viewing area which are viewed through the one aperture portion move in directions away from one another. For example, the left eye viewing area moves to the right and the right eye viewing area moves to the left.

Therefore, as explained above, relative positions of the left eye viewing area and the right eye viewing area may change depending on position of the viewer.

In the shift processing explained above, there is no change in positional relationship between the regions for displaying the left-view image and the regions for displaying the right-view image. Consequently, when change occurs in positional relationship between the left eye viewing area and the right eye viewing area, a discordance occurs between the left eye viewing area and the regions for displaying the left-view image, and likewise between the right eye viewing area and the regions for displaying the right-view image. As a result of the above, cross-talk may occur and thus degradation in image quality of a stereoscopic image may also occur.

The present invention is provided in order to solve the problem which is explained above.

In one embodiment of the present invention, an image display device comprises: a display unit configured to display a plurality of image elements of a first image and a plurality of image elements of a second image in one display pattern; and a separation unit configured to optically separate the image elements of the first image and the image elements of the second image displayed in the one display pattern, wherein in the one display pattern: the image elements of the first image and the image elements of the second image are alternately arranged in a horizontal direction; and along a line in the horizontal direction, an image element of a third image which is not the first image or the second image is positioned between each adjacent pairing of an image element of the first image and an image element of the second image.

In another embodiment of the present invention, an image display method comprises: a display step of displaying a plurality of image elements of a first image and a plurality of image elements of a second image in one display pattern; and a separation step of optically separating the image elements of the first image and the image elements of the second image displayed in the one display pattern, wherein in the one display pattern: the image elements of the first image and the image elements of the second image are alternately arranged in a horizontal direction; and along a line in the horizontal direction, an image element of a third image which is not the first image or the second image is positioned between each adjacent pairing of an image element of the first image and an image element of the second image.

Through the above configuration, when there is displacement in the position of a viewer, image elements of a black image are viewed by a left eye and a right eye of the viewer, thus reducing cross-talk. Therefore, an advantageous effect is achieved of improved image quality of a stereoscopic image.

Furthermore, by displaying the third image as a black image, energy efficiency can be improved.

Alternatively, the image display device relating to the present invention may further comprise: a detection unit configured to detect a position of a viewer; and a switching unit configured to switch the display unit between a first state and a second state in accordance with the position of the viewer which is detected, wherein the display unit displays the image elements of the first image and the image elements of the second image in the one display pattern while in the first state and in another display pattern while in the second state, and in the other display pattern: each image element of the third image in the one display pattern is changed to an image element of the first image or an image element of the second image; and a plurality of consecutive image elements of the first image and a plurality of consecutive image elements of the second image are alternately arranged in the horizontal direction.

Through the above configuration, occurrence of cross-talk or pseudo stereoscopic viewing can be reduced, even when position of the viewer changes, by switching between image display patterns in accordance with the position of the viewer.

Alternatively, in the image display device relating to the present invention, in the one display pattern the image elements of the first image, the image elements of the second image and the image elements of the third image may be arranged in a diagonal striped pattern.

By arranging image elements of a right-view image (first image) and image elements of a left-view image (second image) in a diagonal striped pattern, positional deviation of image elements of the left-view image and image elements of the right-view image in the horizontal direction relative to a vertical direction can be reduced. Consequently, deterioration in horizontal resolution relative to vertical resolution can be reduced for the stereoscopic image.

The following explains, with reference to the drawings, embodiments of the present invention.

First Embodiment

FIG. 1 is an overview diagram which illustrates for a first embodiment, configuration of an image display device and positional relationship between the image display device and a viewer. As illustrated in FIG. 1, the image display device includes an image display unit 21 and an image separation unit 22.

The image display unit 21 is for example a PDP and includes a plurality of sub-pixels 11 in a regular array. Display is performed by dividing the right-view image into sub-pixel units which are thus image elements of a first image and dividing the left-view image into sub-pixel units which are thus image elements of a second image. The image elements of the first image and the image elements of the second image are allotted to the sub-pixels 11 in a display pattern which is explained further below. In the drawings, a sub-pixel for displaying an image element of the first image is indicated by a "1" and a sub-pixel for displaying an image element of the second image is indicated by a "2". The image display unit 21 also includes, for example, a processor and a memory which are not illustrated in the drawings. A function of allotting image elements of the right-view image (first image) and image elements of the left-view image (second image) to the sub-pixels 11 is implemented by the processor executing a program which is stored in the memory.

The image separation unit 22 is for example a liquid-crystal panel and has a structure in which aperture portions, which transmit light, and masking portions, which mask light, are formed in alternation therein through control of applied electrical voltage. By using the masking portions to control direction of light emitted from the sub-pixels 11, the image separation unit 22 performs optical separation of image elements of the first image and image elements of the second image displayed on the image display unit 21.

As illustrated in FIG. 1, the image separation unit 22 is positioned in front of a front surface of the image display unit 21 and is designed such that when the viewer is in an optimum viewing position, a left eye 23 of the viewer can only view image elements of the second image and a right eye 24 of the viewer can only view image elements of the first image.

Figure 2:
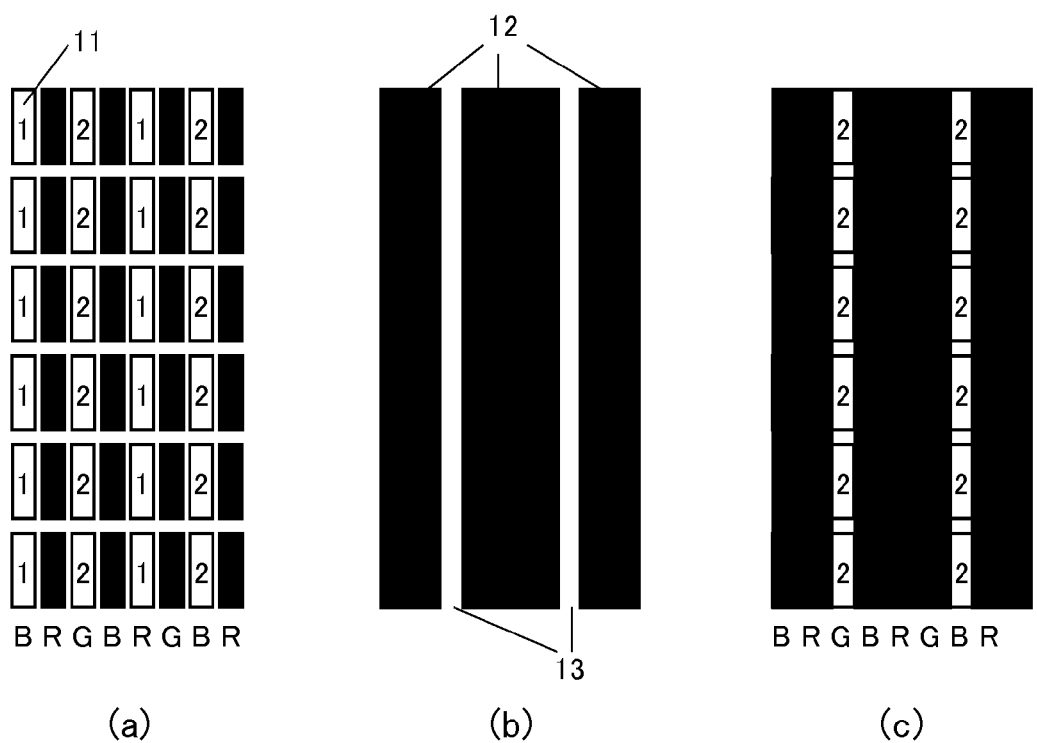
FIG. 2 is an overview diagram illustrating, for an image display art of the first embodiment, an image display unit, an image separation unit, and a state viewed by one eye of the viewer.

FIG. 2 is an overview diagram illustrating, for the first embodiment, the image display unit 21, the image separation unit 22, and the image display device 10 as viewed by the left eye 23 of the viewer.

In FIG. 2, section (a) illustrates one example of a display pattern of image elements of the first image and image elements of the second image which are displayed by the sub-pixels 11 of the image display unit 21. In the display pattern illustrated in FIG. 2, first image element columns, each including a plurality of image elements of the first image arranged in a vertical direction, and second image element columns, each including a plurality of image elements of the second image arranged in the vertical direction, are alternately arranged in a horizontal direction. Furthermore, in the display pattern a third image element column, including a plurality of image elements of an image (third image) which is not the first image or the second image, is positioned between each adjacent pairing of a first image element column and a second image element column. The third image may for example be a black image which does not cause sub-pixels to emit light. Consequently, an order of "first image element column-black image element column-second image element column-black image element column" is repeated on the image display unit 21.

In FIG. 2, section (b) illustrates a front-view of structure of the image separation unit 22. The image separation unit 22 includes a plurality of masking portions 12 and a plurality of aperture portions 13 which are formed in a vertical striped pattern. Each of the aperture portions 13 is approximately equal in width to each of the sub-pixels 11. An interval between adjacent aperture portions 13 is effectively equal to an interval between one first image element column and a next first image element column and also an interval between one second image element column and a next second image element column Herein, the term effectively equal signifies that for any one of the aperture portions 13, when the viewer is at the optimum viewing position, the right eye 24, the aperture portion 13 and a first image element column are arranged along a single straight line, and the left eye 23, the aperture portion 13 and a second image element column are arranged along a single straight line.

In FIG. 2, section (c) illustrates a view when the image display unit 21 is viewed through the image separation unit 22 by the left eye 23 of the viewer at the optimum viewing position. As illustrated in FIG. 2, the left eye 23 of the viewer at the optimum viewing position only views image elements of the second image; in other words, sub-divisions of the left-view image. A black image element column is positioned between each adjacent pairing of a first image element column and a second image element column Therefore, when position of the viewer changes from the optimum viewing position, the black image element column can be viewed by the left eye 23 before the first image element column can be viewed. Through the aforementioned feature, the image display device relating to the present embodiment is able to suppress cross-talk in which one eye simultaneously views both image elements of the first image and image elements of the second image.

MODIFIED EXAMPLES

In the display pattern of image elements of the first image and image elements of the second image illustrated in FIG. 2, columns for displaying image elements of the first image, and likewise columns for displaying image elements of the second image, only occur in a ratio of one column in each four columns which are displayed. As a consequence, a large deterioration in horizontal resolution relative to vertical resolution occurs in the stereoscopic image. In response to the above problem, FIGS. 3-6 illustrate modified examples of the image display device in the first embodiment.

Figure 3:
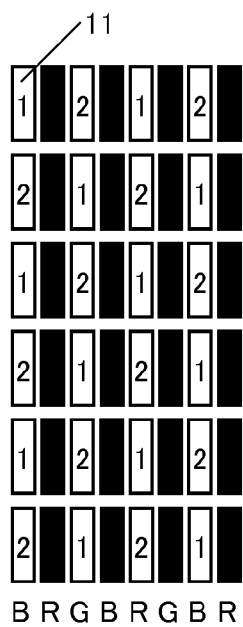
FIG. 3 is an overview diagram illustrating, for the first embodiment, a modified example of the image display unit and the image separation unit illustrated in FIG. 2.
Figure 3:
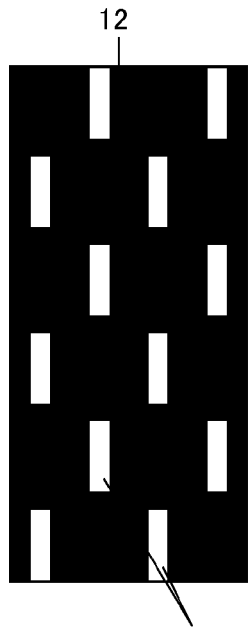
Figure 3:
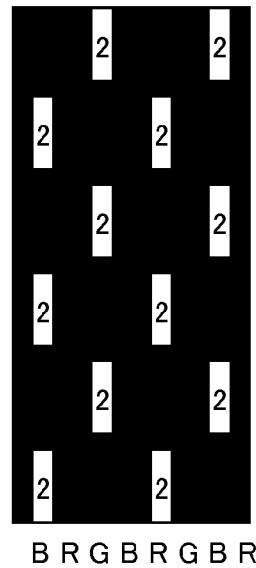

FIG. 3 illustrates a first modified example of the first embodiment.

In FIG. 3, section (a) illustrates, for the first modified example, a display pattern of image elements of the first image and image elements of the second image displayed by sub-pixels 11 of an image display unit 21. In the display pattern illustrated in section (a) of FIG. 3, in terms of the horizontal direction the image elements of the first image and the image elements of the second image are alternately arranged with image elements of the third image positioned therebetween. In terms of the vertical direction image elements of the first image and image elements of the second image are alternately arranged. The display pattern may alternatively be configured such that image elements of the first image, image elements of the second image and image elements of the third image are arranged in a diagonal striped pattern. In the aforementioned configuration, inclination angle of the stripes is approximately equal to inclination angle of a diagonal of a rectangular region composed of one sub-pixel in the vertical direction and two sub-pixels in the horizontal direction.

In FIG. 3, section (b) illustrates, for the first modified example, a front-view of structure of an image separation unit 22. As illustrated in section (b) of FIG. 3, the image separation unit 22 includes a lattice of a plurality of aperture portions 13 which are each approximately equal in size to each of the sub-pixels 11. The aperture portions 13 are arranged in a stepped pattern. A positional relationship between the aperture portions 13 is effectively equal to a positional relationship between a plurality of the sub-pixels 11 which display image elements of the first image, and is also effectively equal to a positional relationship between a plurality of the sub-pixels 11 which display image elements of the second image.

In FIG. 3, section (c) illustrates, for the first modified example, a view when the image display unit 21 is viewed through the image separation unit 22 by the left eye 23 of the viewer at the optimum viewing position. As illustrated in FIG. 3, in the first modified example positional deviation of image element of the first image (second image) with regards to the horizontal direction and the vertical direction is reduced. Consequently, deterioration in horizontal resolution relative to vertical resolution is reduced.

Figure 4:
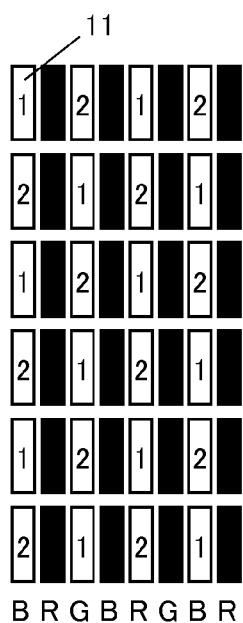
FIG. 4 is an overview diagram illustrating, for the first embodiment, a modified example of the image separation unit illustrated in FIG. 3.
Figure 4:
Figure 4:
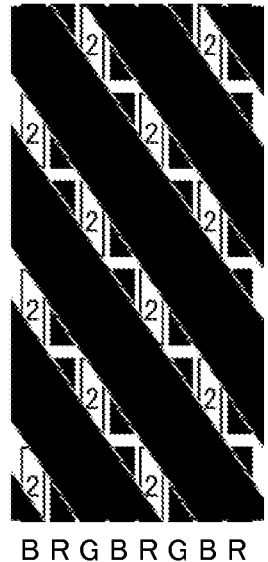

FIG. 4 illustrates a second modified example of the first embodiment of the present invention. In FIG. 4, image element arrangement illustrated in section (a) is the same as in the first modified example; therefore, explanation thereof is omitted.

In FIG. 4, section (b) illustrates, for the second modified example, a front-view of structure of an image separation unit 22. As illustrated in section (b) of FIG. 4, the image separation unit 22 includes a plurality of masking portions 12 and a plurality of aperture portions 13 formed in a diagonal striped pattern. Each of the aperture portions 13 is approximately equal in width to each of the sub-pixels 11. An interval between adjacent aperture portions 13 is effectively equal to an interval between one first image element column and a next first image element column and is also effectively equal to an interval between one second image element column and a next second image element column. An inclination angle of the diagonal stripes in the image separation unit 22 is approximately equal to an inclination angle of diagonal stripes formed by image elements of the first image, image elements of the second image and image elements of the third image displayed on the image display unit 21. In other words, the inclination angle of the diagonal stripes in the image separation unit 22 is approximately equal to an inclination angle of a diagonal of a rectangular region composed of one sub-pixel in the vertical direction and two sub-pixels in the horizontal direction.

In FIG. 4, section (c) illustrates, for the second modified example, a view when the image display unit 21 is viewed through the image separation unit 22 by the left eye 23 of the viewer at the optimum viewing position. As illustrated in section (c) of FIG. 4, when a parallax barrier is used which is formed in a diagonal striped pattern, the left eye 23 of the viewer is able to view image elements of a black image (third image), even when the viewer is at the optimum viewing position. In a conventional image display device, image elements of the first image (right-view image) are displayed instead of image elements of the black image, and as a consequence cross-talk occurs in the conventional image display device. In contrast, image elements of the black image are displayed in the present modified example, reducing occurrence of cross-talk.

Furthermore, positional deviation of image elements of the first image (second image) with regards to the horizontal direction and the vertical direction is reduced in the second modified example in the same way as in the first modified example. Therefore, deterioration in horizontal resolution relative to vertical resolution is reduced.

Figure 5:
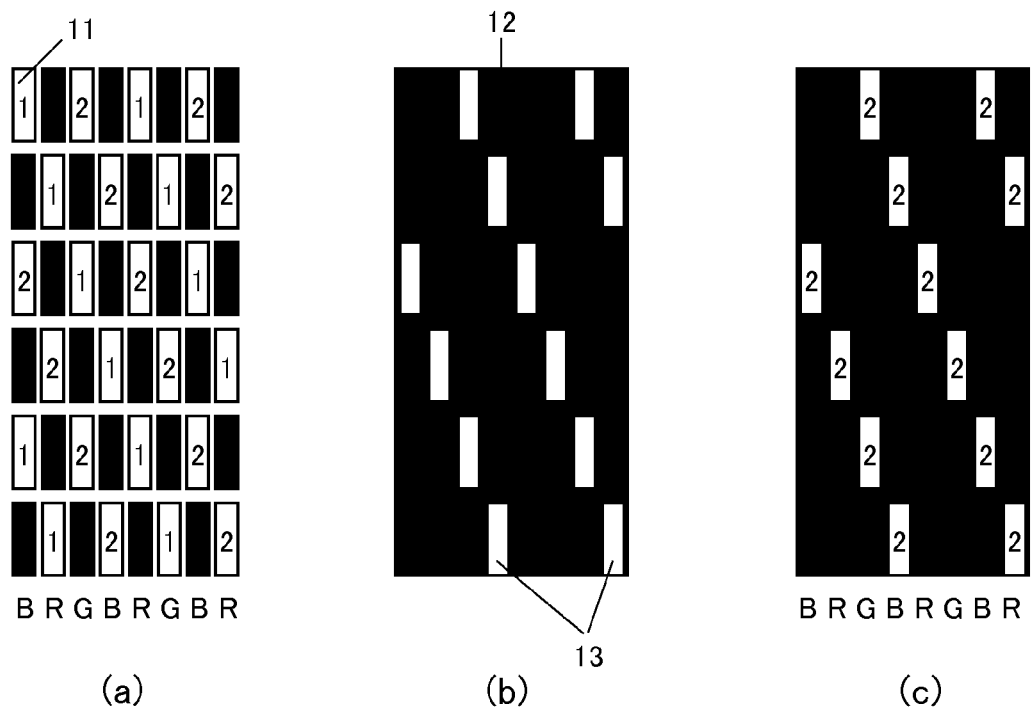
FIG. 5 is an overview diagram illustrating, for the first embodiment, a modified example of the image display unit and the image separation unit illustrated in FIG. 2.

FIG. 5 illustrates a third modified example of the first embodiment of the present invention.

In FIG. 5, section (a) illustrates, for the third modified example, a display pattern of image elements of the first image and image elements of the second image which are displayed by sub-pixels 11 of an image display unit 21. In the display pattern illustrated in section (a) of FIG. 5, image elements of the first image and image elements of the second image are alternately arranged both in the horizontal direction and in the vertical direction. Also, image elements of the third image are positioned between each adjacent pairing of an image element of the first image and an image element of the second image both in terms of the horizontal direction and the vertical direction. The display pattern may alternatively be configured such that image elements of the first image, image elements of the second image and image elements of the third image are arranged in a diagonal striped pattern. In the aforementioned configuration, inclination angle of the stripes is approximately equal to inclination angle of a diagonal of a sub-pixel.

In FIG. 5, section (b) illustrates, for the third modified example, a front-view of structure of an image separation unit 22. As illustrated in section (b) of FIG. 5, the image separation unit 22 includes a lattice of a plurality of aperture portions 13 which are each approximately equal in size to each of the sub-pixels 11. The aperture portions 13 are arranged in a stepped pattern. A positional relationship between the aperture portions 13 is effectively equal to a positional relationship between a plurality of the sub-pixels 11 which display image elements of the first image, and is also effectively equal to a positional relationship between a plurality of the sub-pixels 11 which display image elements of the second image.

In FIG. 5, section (c) illustrates, for the third modified example, a view when the image display unit 21 is viewed through the image separation unit 22 by the left eye 23 of the viewer at the optimum viewing position. As illustrated in section (c) of FIG. 5, positional deviation of image elements of the first image (second image) with regards to the horizontal direction and the vertical direction is reduced. Consequently, deterioration in horizontal resolution relative to vertical resolution is reduced.

Figure 6:
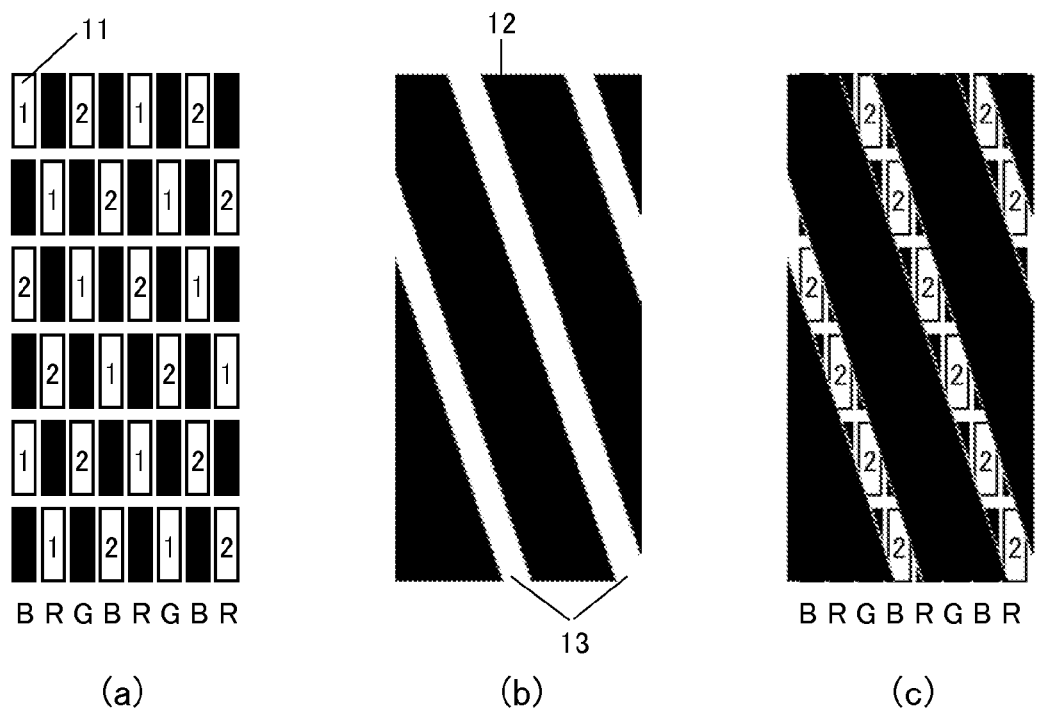
FIG. 6 is an overview diagram illustrating, for the first embodiment, a modified example of the image separation unit illustrated in FIG. 5.

FIG. 6 illustrates a fourth modified example of the first embodiment of the present invention. In FIG. 6, image element arrangement illustrated in section (a) is the same as in the third modified example; therefore, explanation thereof is omitted.

In FIG. 6, section (b) illustrates, for the fourth modified example, a front-view of structure of an image separation unit 22. As illustrated in section (b) of FIG. 6, the image separation unit 22 includes a plurality of masking portions 12 and a plurality of aperture portions 13 formed in a diagonal striped pattern. Each of the aperture portions 13 is approximately equal in width to each of the sub-pixels 11. An interval between adjacent aperture portions 13 is effectively equal to an interval between one first image element column and a next first image element column, and is also effectively equal to an interval between one second image element column and a next second image element column. An inclination angle of the diagonal stripes in the image separation unit 22 is approximately equal to an inclination angle of diagonal stripes formed by image elements of the first image, image elements of the second image and image elements of the third image displayed on the image display unit 21. In other words, the inclination angle of the diagonal stripes in the image separation unit 22 is approximately equal to an inclination angle of a diagonal of a sub-pixel.

In FIG. 6, section (c) illustrates, for the fourth modified example, a view when the image display unit 21 is viewed through the image separation unit 22 by the left eye 23 of the viewer at the optimum viewing position.

Cross-talk occurring in a conventional image display device even when the viewer is at the optimum viewing position can be suppressed in the fourth modified example in the same way as explained for the second modified example.

Furthermore, positional deviation of image elements of the first image (second image) with regards to the horizontal direction and the vertical direction is reduced in the fourth modified example in the same way as explained for the third modified example. Therefore, deterioration in horizontal resolution relative to vertical resolution can be reduced.

Second Embodiment

In the image display device relating to the first embodiment, when position of the viewer changes, pseudo stereoscopic viewing may occur in which the left eye of the viewer views the right-view image and the right eye of the viewer views the left-view image. A second embodiment explains an image display device which detects position of a viewer and controls display in accordance with the position of the viewer. As a result, the image display device in the second embodiment is able to suppress occurrence of cross-talk and pseudo stereoscopic viewing, even when position of the viewer changes.

Figure 7:
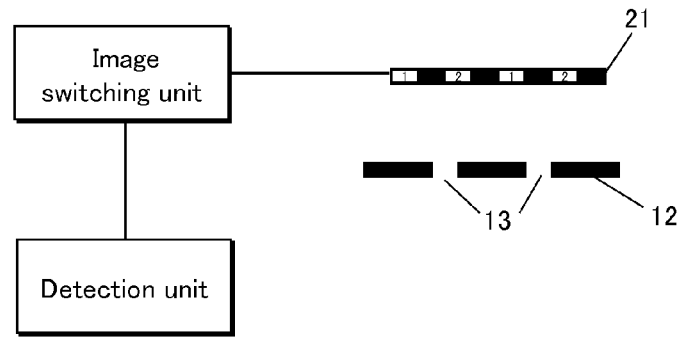
FIG. 7 is a configuration diagram illustrating, for the first embodiment, a modified example in which a detection art is added.

FIG. 7 illustrates the image display device relating to the second embodiment of the present invention. The image display device relating to the second embodiment includes a detection unit and an image switching unit in addition to configuration of the image display device relating to the first embodiment.

The detection unit has a function of acquiring an image of the viewer using a charge coupled device (CCD) image sensor and a function of detecting position of a head of the viewer from the image through execution, by the processor, of a face detection program stored in the memory.

The image switching unit outputs a signal for controlling display by the image display unit 21 in accordance with the position of the head of the viewer which is detected by the detection unit. More specifically, based on the position of the head of the viewer (position of a left eye and a right eye), the image switching unit calculates regions viewed by the left eye of the viewer (left eye viewing area 81) and regions viewed by the right eye of the viewer (right eye viewing area 82). The image switching unit subsequently outputs a signal to the image display device 21 indicating either a first state or a second state, dependent on the left eye viewing area 81 and the right eye viewing area 82 which are calculated. The image switching unit implements the aforementioned functions through execution, by the processor, of a program stored in the memory.

The image display unit 21 performs display of a stereoscopic image in accordance with the signal output from the image switching unit by using different display patterns in the first state and the second state.

Figure 8:
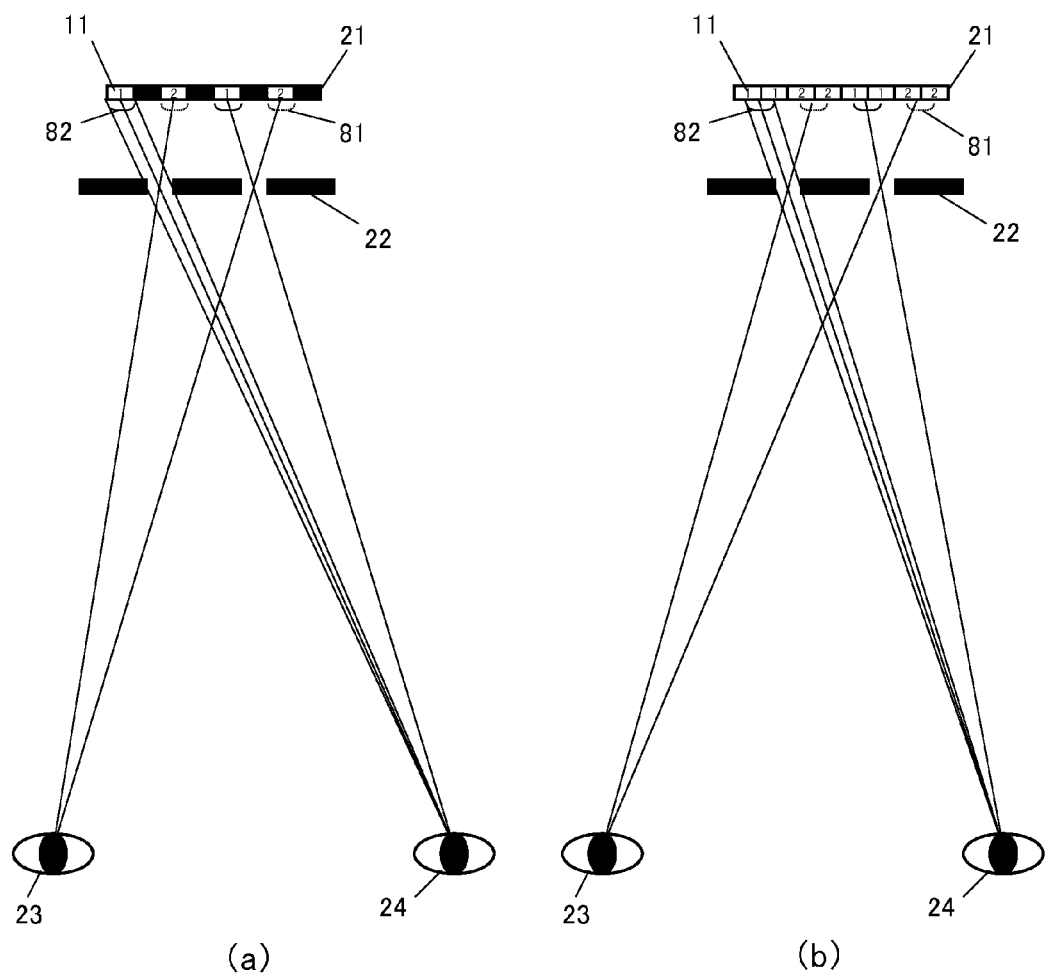
FIG. 8 is an overview diagram illustrating, for the first embodiment, a relationship between image display state and sideways change in position of a viewer in FIG. 7.

FIG. 8 illustrates, for the second embodiment, relationship between display pattern of the image display unit 21, and the left eye viewing area and the right eye viewing area.

In FIG. 8, section (a) illustrates an example in which the viewer is at the optimum viewing position, and thus the left eye viewing area 81 (right eye viewing area 82) overlaps with one of the sub-pixels 11 on the image display unit 21. In the aforementioned situation, the image switching unit outputs a signal to the image display unit 21 indicating the first state. When the signal indicating the first state is output by the image switching unit, the image display unit 21 performs display of a stereoscopic image using the same pattern as in the first embodiment, in which image elements of the first image and image elements of the second image are alternately arranged in the horizontal direction, and an image element of the third image is positioned between each adjacent pairing of an image element of the first image and an image elements of the second image.

In FIG. 8, section (b) illustrates an example in which the viewer is not at the optimum viewing position, and thus the left eye viewing area 81 (right eye viewing area 82) centers approximately on a boundary between two of the sub-pixels 11 on the image display unit 21. In the aforementioned situation, the image switching unit outputs a signal to the image display unit 21 indicating the second state. When the signal indicating the second state is output by the image switching unit, the image display unit 21 performs display of a stereoscopic image using a display pattern in which image elements of the second image are allotted to both of the sub-pixels in the left eye viewing area 81 and image elements of the first image are allotted to both of the sub-pixels in the right eye viewing area 82. In other words, the display pattern for the second state is equivalent to the display pattern for the first state in which each image element of the third image is changed to either an image element of the first image or an image element of the second image, thereby forming a pattern in which two consecutive image elements of the first image and two consecutive image elements of the second image are alternately arranged in the horizontal direction.

Figure 9:
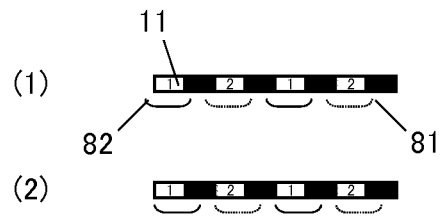
FIG. 9 is an overview diagram illustrating, for the first embodiment, a relationship between image display state and change of area which is visible through an aperture portion.
Figure 9:
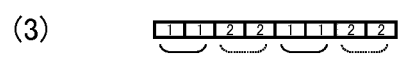
Figure 9:
Figure 9:
Figure 9:
Figure 9:

The following explains in more detail, with reference to section (a) of FIG. 9, relationship between display pattern of the image display unit 21, and the left eye viewing area 81 and the right eye viewing area 82.

In FIG. 9, example (1) illustrates a situation in which the left eye viewing area 81 and the right eye viewing area 82 each overlap with one of the sub-pixels 11 in the same way as illustrated in section (a) of FIG. 8. In FIG. 9, example (2) illustrates a situation in which the viewer moves slightly to the left relative to example (1), and thus the left eye viewing area 81 and the right eye viewing area 82 are positioned slightly to the right relative to example (1). In both of examples (1) and (2) illustrated in FIG. 9, the left eye viewing area 81 and the right eye viewing area 82 each entirely include the one sub-pixel corresponding thereto. In the aforementioned situations, the image switching unit outputs a signal to the image display unit 21 indicating the first state.

In FIG. 9, example (3) illustrates a situation in which the viewer moves to the left relative to example (2), and thus the left eye viewing area 81 and the right eye viewing area 82 are positioned to the right relative to example (2). In the situation in example (3), the left eye viewing area 81 and the right eye viewing area 82 each center on a boundary between two of the sub-pixels 11 on the image display unit 21 in the same way as illustrated in section (b) of FIG. 8. Neither the left eye viewing area 81 nor the right eye viewing area 82 entirely includes either of the two sub-pixels 11 corresponding thereto. In the aforementioned situation, the image switching unit outputs a signal to the image display unit 21 indicating the second state.

In FIG. 9, example (4) illustrates a situation in which the viewer moves to the left relative to example (3), and thus the left eye viewing area 81 and the right eye viewing area 82 once again each entirely include one of the sub-pixels 11. In FIG. 9, example (5) illustrates a situation in which the viewer moves to the left relative to example (4), and thus the left eye viewing area 81 and the right eye viewing area 82 each overlap with the one sub-pixel corresponding thereto. In the situations illustrated in examples (4) and (5) in FIG. 9, the image switching unit outputs a signal to the image display unit 21 indicating the first state. However, the image display unit 21 compares the situations illustrated in examples (1) and (2) in FIG. 9, and performs display such that image elements of the first image and image elements of the second image are each shifted one sub-pixel toward the right.

The image display device relating to the second embodiment combines an art of head-tracking with the image display device relating to the first embodiment and controls image display pattern in accordance with position of the head of the viewer. Through the configuration explained above, the image display device relating to the second embodiment is able to suppress occurrence of cross-talk and pseudo stereoscopic viewing, even in a situation in which there is a significant change in position of the viewer.

Furthermore, as illustrated in section (b) of FIG. 9, in order that brightness of the stereoscopic image is the same in the second state as in the first state, the image display unit 21 may adjust brightness of each of the sub-pixels 11 in accordance with an area of the sub-pixel 11 included in the left eye viewing area 81 or the right eye viewing area 82.

For example, in a situation in which two sub-pixels are both partially included in the left eye viewing area 81 (right eye viewing area 82), if a larger area of a sub-pixel on the left is viewed such as illustrated in example (3-1) in FIG. 9, brightness of the sub-pixel on the left is set higher than brightness of a sub-pixel on the right. Conversely, if a larger area of the sub-pixel on the right is viewed such as illustrated in example (3-2) in FIG. 9, brightness of the sub-pixel on the right is set higher than brightness of the sub-pixel on the left.

The configuration described above enables smooth transition between the first state and the second state.

<Supplementary Explanation>

The above explains embodiments of the image display device relating to the present invention, but the following configurations are also included within the general concept of the present invention.

(1) In the above embodiments an example is explained in which the image display unit is a PDP, but alternatively the image display unit may for example be a liquid-crystal display or an EL display.

(2) In the second embodiment the detection unit is implemented using a CCD, however the detection unit is not limited by the above. Alternatively, the detection unit may be implemented using a complementary metal oxide semiconductor (CMOS) image sensor to acquire an image of the viewer, or further alternatively may be implemented using an infrared sensor to detect position of the viewer.

(3) In the above embodiments, an example is explained in which the image display unit has a BRG pixel arrangement, but the image display unit may alternatively have a different pixel arrangement such as a RGB pixel arrangement.

(4) In the above embodiments, an example is explained in which each of the sub-pixels has a rectangular shape, but the sub-pixels may alternatively have a different shape such as a bent shape.

(5) In the above embodiments, the aperture portions of the parallax barrier are approximately equal in width to the sub-pixels, but alternatively the aperture portions may have a different width to the sub-pixels.

(6) In the above embodiments, an example is explained in which image separation is performed by a parallax barrier system, but alternatively image separation may be performed by a lenticular system. In the lenticular system, the image separation unit is implemented as a lenticular lens. The term lenticular lens refers to a plurality of cylindrical lenses which are formed in a sheet shape.

Figure 10:
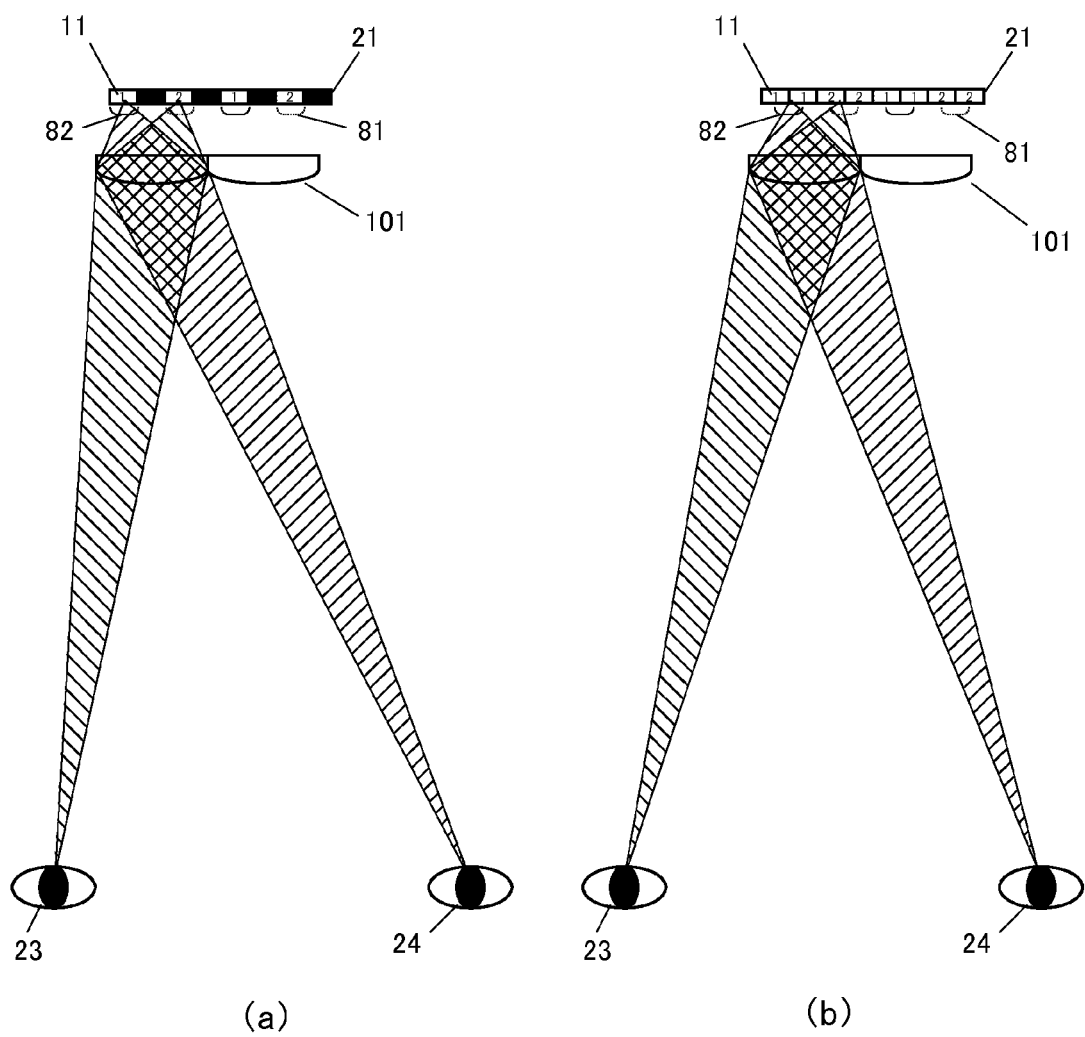
FIG. 10 is an overview diagram illustrating, for the first embodiment, a relationship between image display state and sideways change in position of a viewer for an image display art which uses a lenticular lens.

FIG. 10 illustrates an example of the image display device in which the image separation unit 22 is implemented as a lenticular lens 101.

As illustrated in section (a) of FIG. 10, when the viewer at the optimum viewing position views the image display unit 21 through the lenticular lens 101, light is refracted by cylindrical lenses in the lenticular lens 101 such that the left eye of the viewer only views image elements of the second image and the right eye of the viewer only views image elements of the first image.

Even in the configuration in which the image separation unit 22 is implemented as the lenticular lens, the stereoscopic image can be displayed using the same display pattern as explained in the first embodiment. Consequently, the aforementioned configuration can achieve the same effect of suppressing occurrence of cross-talk as explained for the first embodiment.

Furthermore, as illustrated in section (b) of FIG. 10, by switching the image display unit to the second state in accordance with position of the viewer, occurrence of cross-talk and pseudo stereoscopic viewing can be suppressed in the same way as explained for the second embodiment.

Figure 11:
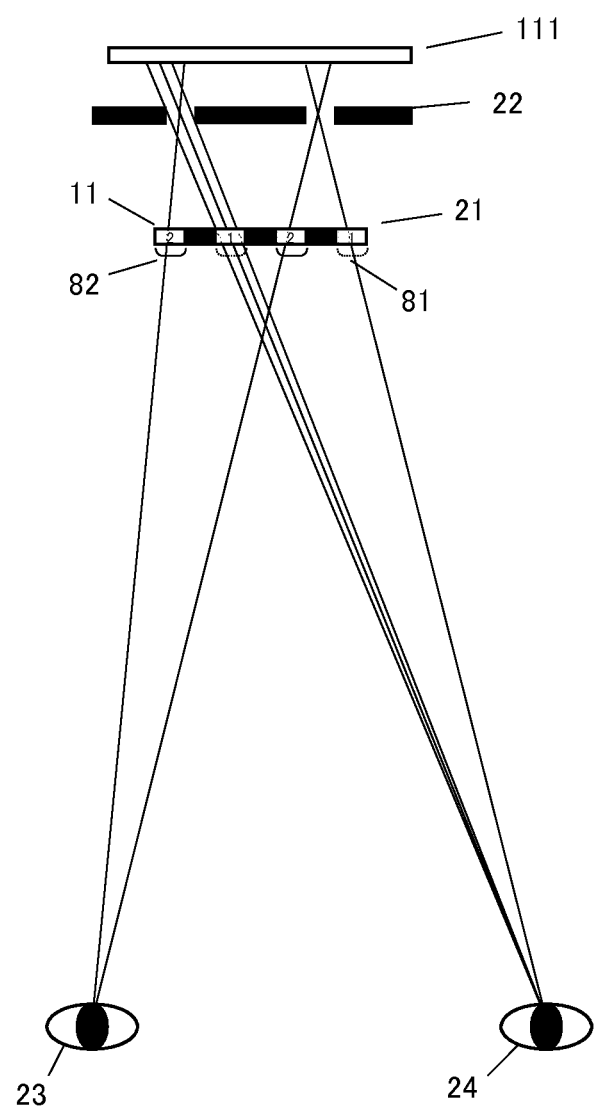
FIG. 11 is an overview diagram illustrating, for the first embodiment, a relationship between image display state and sideways change in position of a viewer for an image display art which uses a rear positioned parallax barrier.

(7) In the above embodiments, an example is explained in which the image separation unit is positioned in front of a front surface of the image display unit, but the image separation unit is not limited to the aforementioned position. Alternatively, the separation unit may be implemented as a parallax barrier which is positioned between a liquid-crystal panel and a backlight 111 of a liquid-crystal display, such as illustrated in FIG. 11.

(8) In the above embodiments a backlight is used as a light source and a barrier is used to control light-rays. In an alternative system, light-rays may be controlled by using a sub-divided light source such as a line light source or a stepped light source.

(9) In the above embodiments, an example is explained in which sub-pixel columns which display an image (i.e., first image element columns and second image element columns) and sub-pixel columns which do not display an image (i.e., third image element columns) are arranged in alternation of single sub-pixel columns. Alternatively, the alternation may be of multiple sub-pixel columns displaying an image and multiple sub-pixel columns not displaying an image. Further alternatively, the alternation may be of multiple sub-pixel columns displaying an image and single sub-pixel columns not displaying an image, or likewise may be of single sub-pixel columns displaying an image and multiple sub-pixel columns not displaying an image.

For example, by positioning two or more sub-pixel columns which do not display an image between sub-pixel columns which display an image, occurrence of cross-talk can be suppressed even when a distance between the viewer and the image display device changes. The following explains, with reference to FIG. 12, an image display device which is responsive to change in distance between a viewer and the image display device.

Figure 12:
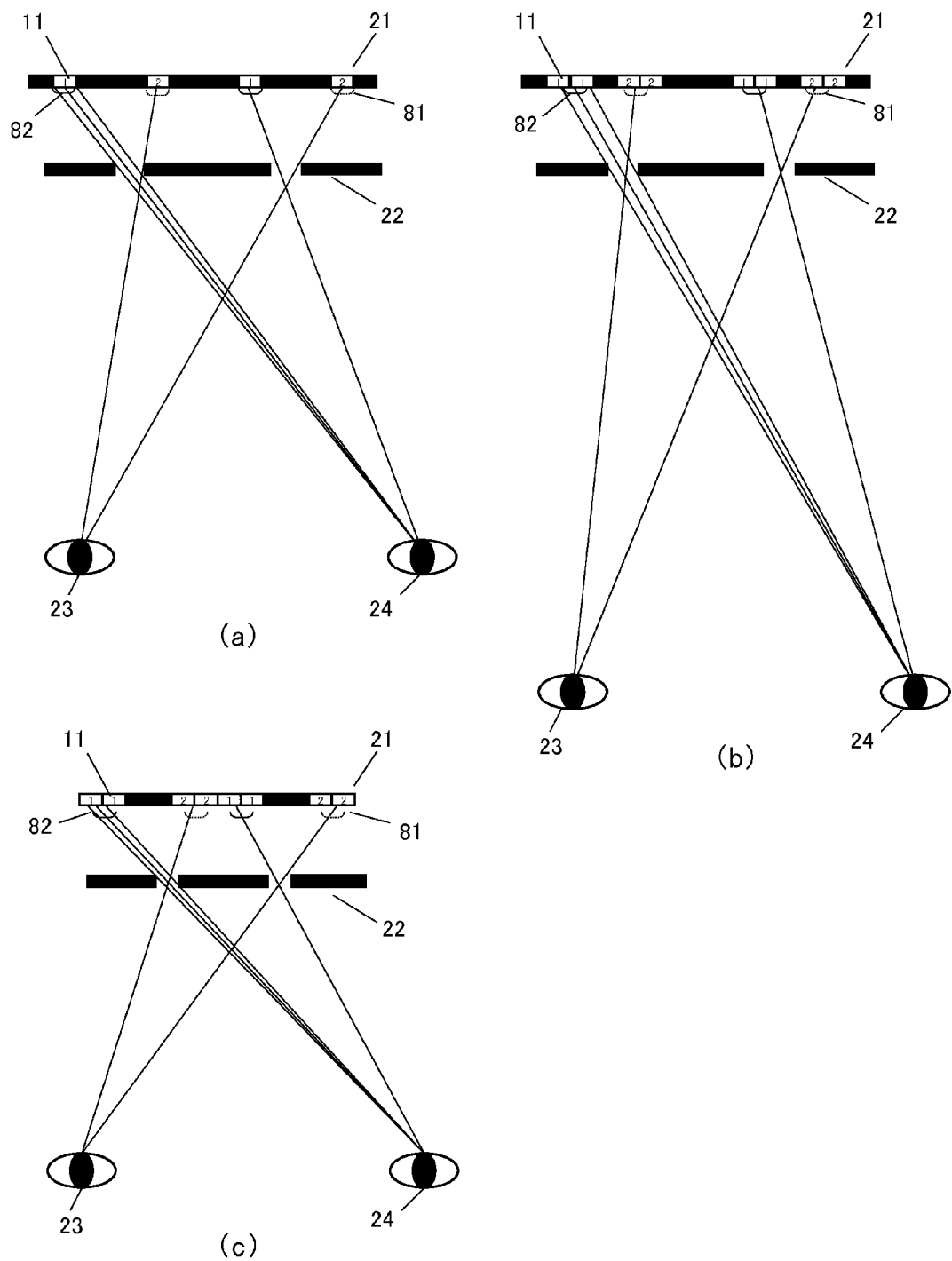
FIG. 12 is an overview diagram illustrating, for the first embodiment, a relationship between image display state and forward-backward change in position of a viewer for an image display art which uses a front positioned parallax barrier.

In FIG. 12, section (a) illustrates image viewing area (left eye viewing area 81 and right eye viewing area 82) when the viewer is at the optimum viewing position. In FIG. 12, section (b) illustrates image viewing area when the viewer is positioned further away from the image display device. In FIG. 12, the left eye viewing area 81 in section (b) is further to the left than in section (a) and the right eye viewing area 82 in section (b) is further to the right than in section (a). In the above situation, a change of display pattern is required such that sub-pixels for displaying image elements of the first image are further to the right and sub-pixels for displaying image elements of the second image are further to the left as illustrated in FIG. 12.

In FIG. 12, section (c) illustrates image viewing area when the viewer is positioned closer to the image display device. In FIG. 12, the left eye viewing area 81 in section (c) is further to the right than in section (a) and the right eye viewing area 82 in section (c) is further to the left than in section (a). In the above situation, a change of display pattern is required such that sub-pixels for displaying image elements of the first image are further to the left and sub-pixels for displaying image elements of the second image are further to the right as illustrated in FIG. 12.

By positioning two or more sub-pixel columns which do not display an image between sub-pixel columns which display an image, the display pattern can be changed such as described above. Consequently, by positioning two or more sub-pixel columns which do not display an image between sub-pixel columns which display an image, occurrence of cross-talk can be suppressed even when distance between the viewer and the image display device changes.

(10) The second embodiment is explained under a premise that there is only one viewer, but alternatively there may be a plurality of viewers. For example, in a situation in which there are two viewers (viewer A and viewer B), the image display unit 21 is required to display two different display patterns; a display pattern for viewer A and a display pattern for viewer B. In the aforementioned situation, the image display unit 21 performs time-sharing in order to display the display pattern for viewer A and the display pattern for viewer B in temporal alternation. Through the above configuration, both viewer A and viewer B are able to experience, to a certain extent, an advantageous effect of improved stereoscopic image quality, due to occurrence of cross-talk and pseudo stereoscopic viewing being suppressed. In the above situation, the image separation unit 22 may have a configuration in which positions of aperture portions and masking portions can be changed, and positions of the aperture portions and the masking portions in the image separation unit 22 may be changed in accordance with the display pattern.

(11) In the second embodiment, a configuration is explained in which a criterion for determining switching between the first state and the second state is whether a sub-pixel is completely included in the left eye viewing area 81 (right eye viewing area 82) which is viewed through one of the aperture portions. Another embodiment of the present invention may have a configuration in which a central position, in terms of the horizontal direction, of the left eye viewing area 81 (right eye viewing area 82) viewed through one of the aperture portions is used as a reference position. Switching between the first state and the second state may be performed based on whether the reference position is closer to a central position of a certain sub-pixel group or a boundary position of the sub-pixel group. In other words, when the reference position is closer to the central position of the sub-pixel group than to the boundary position of the sub-pixel group, the sub-pixel group may display image elements of the second image (first image) in the first display state. On the other hand, when the reference position is closer to the boundary position than to the central position, the sub-pixel group and another sub-pixel group which is adjacent thereto, in terms of direction of the boundary position, may both display image elements of the second image (first image) in the second state. The term sub-pixel group refers to one or more sub-pixel columns displaying image elements of the first image or image elements of the second image.

INDUSTRIAL APPLICABILITY

The image display device relating to the present invention is able to suppress cross-talk which occurs due to viewing position or configuration of an image separation unit, and thus is able to improve image quality of a stereoscopic image which is viewed. The image display device can be used to display information in a wide range of fields such as televisions, computers, digital signs, video game machines and medical technology.

REFERENCE SIGNS LIST

11 sub-pixel
12 masking portion
13 aperture portion
21 image display unit
22 image separation unit
23 left eye
24 right eye
81 left eye viewing area
82 right eye viewing area
101 lenticular lens
111 backlight

The invention claimed is:

1. An image display device comprising:
a display unit configured to display a plurality of image elements of a first image and a plurality of image elements of a second image in one display pattern;
a separation unit configured to optically separate the image elements of the first image and the image elements of the second image displayed in the one display pattern;
a detection unit configured to detect a position of a viewer; and
a switching unit configured to switch the display unit between a first state and a second state in accordance with the position of the viewer which is detected, wherein
in the one display pattern:
the image elements of the first image and the image elements of the second image are alternately arranged in a horizontal direction; and
along a line in the horizontal direction, an image element of a third image which is not the first image or the second image is positioned between each adjacent pairing of an image element of the first image and an image element of the second image;
the display unit displays the image elements of the first image and the image elements of the second image in the one display pattern while in the first state and in another display pattern while in the second state, and
in the other display pattern:
each image element of the third image in the one display pattern is changed to an image element of the first image or an image element of the second image; and
a plurality of consecutive image elements of the first image and a plurality of consecutive image elements of the second image are alternately arranged in the horizontal direction.

2. The image display device of claim 1, wherein
in the one display pattern the image elements of the first image, the image elements of the second image and the image elements of the third image are arranged in a diagonal striped pattern.

3. An image display method comprising:
a display step of displaying a plurality of image elements of a first image and a plurality of image elements of a second image in one display pattern;
a separation step of optically separating the image elements of the first image and the image elements of the second image displayed in the one display pattern;
a detection step of detecting a position of a viewer; and
a switching step of switching the displaying between a first state and a second state in accordance with the position of the viewer which is detected, wherein
in the one display pattern:
  the image elements of the first image and the image elements of the second image are alternately arranged in a horizontal direction; and
  along a line in the horizontal direction, an image element of a third image which is not the first image or the second image is positioned between each adjacent pairing of an image element of the first image and an image element of the second image;
the display step displays the image elements of the first image and the image elements of the second image in the one display pattern while in the first state and in another display pattern while in the second state, and
in the other display pattern:
  each image element of the third image in the one display pattern is changed to an image element of the first image or an image element of the second image; and
a plurality of consecutive image elements of the first image and a plurality of consecutive image elements of the second image are alternately arranged in the horizontal direction.

\* \* \* \* \*